(12) United States Patent
Schmidt et al.

(10) Patent No.: US 7,874,569 B2
(45) Date of Patent: Jan. 25, 2011

(54) DISPLACEMENT DEVICE FOR A FIFTH-WHEEL TRACTION COUPLING

(75) Inventors: Dirk Schmidt, Königstein (DE); Rainer Spitz, Eltville (DE); José Algüera, Aschaffenburg (DE)

(73) Assignee: Jost-Werke GmbH, Neu-Isenberg (DE)

( * ) Notice: Subject to any disclaimer, the term of this patent is extended or adjusted under 35 U.S.C. 154(b) by 183 days.

(21) Appl. No.: 11/990,458

(22) PCT Filed: Aug. 16, 2006

(86) PCT No.: PCT/EP2006/008070
§ 371 (c)(1),
(2), (4) Date: Feb. 14, 2008

(87) PCT Pub. No.: WO2007/022904
PCT Pub. Date: Mar. 1, 2007

(65) Prior Publication Data
US 2009/0230655 A1    Sep. 17, 2009

(30) Foreign Application Priority Data
Aug. 25, 2005  (DE) .................. 10 2005 040 146

(51) Int. Cl.
*B62D 53/08*  (2006.01)
(52) U.S. Cl. ............... 280/438.1; 280/434; 280/407
(58) Field of Classification Search .......... 280/438.1, 280/434, 407
See application file for complete search history.

(56) References Cited

U.S. PATENT DOCUMENTS

| 2,903,275 | A | * | 9/1959 | Walther ................. 280/407 |
| 3,498,635 | A | | 3/1970 | Braunberger |
| 5,368,324 | A | * | 11/1994 | Kaim ................. 280/438.1 |
| 5,839,745 | A | | 11/1998 | Cattau et al. |
| 2005/0082777 | A1 | | 4/2005 | Burchett |

FOREIGN PATENT DOCUMENTS

| DE | 17 80 488 B2 | 9/1976 |
| DE | 199 44 684 C1 | 11/2000 |
| EP | 0 052 792 A2 | 6/1982 |
| EP | 0 481 928 A1 | 4/1992 |
| WO | WO 97/14606 A1 | 4/1997 |
| WO | WO 2005/037578 A2 | 4/2005 |

* cited by examiner

*Primary Examiner*—Lesley Morris
*Assistant Examiner*—Marlon A Arce
(74) *Attorney, Agent, or Firm*—Hudak, Shunk & Farine Co. LPA

(57) ABSTRACT

A displacement device for a fifth wheel traction coupling with two base bars and a fifth wheel traction coupling supporting top part which includes two bearing chocks which are slidingly fixed to the base bars and telescoping in a locked position thereof into each base bar by means locking elements with the aid of a rack rail. The known per se sliding devices are expensive due to the production of the base bars, since the rack rails are provided with a toothed profile prior to be welded. A low-cost sliding device is producible in a simple manner. For this purpose, at least one base bar is provided with spaced rest windows on the axial extension thereof for receiving the locking elements.

16 Claims, 3 Drawing Sheets

DISPLACEMENT DEVICE FOR A FIFTH-WHEEL TRACTION COUPLING

FIELD OF THE INVENTION

The invention relates to a displacement device for fifth wheel couplings, comprised of two base bars and an upper part or upper carriage, which upper part or upper carriage bears the fifth wheel coupling, wherewith said upper part or upper carriage is comprised of two bearing blocks which are mounted so as to be slidable on the base bars, and wherewith each of which bearing blocks, when in a locked position, engages a respective one of the base bars by means of locking pieces.

BACKGROUND OF THE INVENTION

A displacement device is a device which bears the fifth wheel coupling of a tractor vehicle, allowing the fifth wheel coupling to be displaced in the longitudinal direction of the vehicle, wherewith means are provided whereby the fifth wheel coupling can be fixed in various positions. Such a displacement device is disclosed in, e.g. DE AS 1780488.

In general, a tractor vehicle which has a fifth wheel coupling has a frame structure comprised of two interiorly open C-profiles which are joined to crossbeams. Often, the C-profiles are provided with auxiliary frame means for mounting the displacement device. A displacement device disclosed in DE 19944684 C1 has a base frame having a generally flat construction which base frame is connected to the auxiliary frame means by screw means or by welding. The base frame is comprised of at least two mutually parallel base bars each of which bears a toothed bar on which the upper part or upper carriage with the fifth wheel coupling and the bearing blocks which support the fifth wheel coupling is displaceably guided. In order to fix the upper part or upper carriage to the base bars, locking pieces are provided on the bearing blocks, which locking pieces can be brought into form-interlocking engagement with the toothed bar.

In order to displace the upper part, it is necessary to temporarily remove the locking pieces from the engagement zone of the toothed bar; this allows the upper part to be moved in the forward or rear direction on the base bars.

A major drawback of the known displacement devices is that the base bars are costly to fabricate, because of the necessity to weld the toothed bar to the profile or toothed profile. Also the displacement device is heavy because of the toothing over the entire length of the toothed bar, even though only 2-3 teeth are in engagement at a given time.

SUMMARY OF THE INVENTION

Accordingly, the underlying problem of the present invention was to devise a displacement device which is easy to fabricate, lightweight, and inexpensive.

This problem is solved according to the invention in that at least one of the base bars has catch openings disposed at distances along its axial extent, which catch openings serve to accommodate the locking piece(s). Preferably, the catch openings penetrate the base bars each catch opening extends completely through the material of the base bar. Alternatively, it is possible that the catch openings extend only partially through the respective base bar. An essential advantage of the invention is that one avoids welding-on of the toothed bar or toothed profile, which welding is difficult and time-intensive. The inventive profile is quite compact and therefore light in weight. Further, in the absence of the toothed bar(s), the bearing blocks may be narrower as well as being vertically shorter.

According to a particular embodiment, the base bar is in the form of an angle profile of unit construction. The angle profile is free of components which must be attached to it, further reducing its fabrication cost. Also, no welding is required, thus eliminating the attendant thermal stresses to which the angle profile would be subjected; accordingly, the fabrication of the angle profile is free of attendant material stresses and thermally caused shape distortion.

Advantageously, the base bar is in the form of an angle profile with a vertical web member, wherewith the catch openings are disposed in said vertical web member. This configuration enables a very compact structure, as to the vertical and width dimensions of the base bar.

Preferably, the angle profile is a C-profile having an upper leg member and a lower leg member. The lower leg member serves to rest on the frame structure of the tractor vehicle or on the auxiliary frame. The upper part or upper carriage extends around and engages the upper leg member, wherewith the upper leg member prevents vertical upward movement of the fifth wheel coupling with respect to the base bar.

It has been found advantageous if the upper leg member and lower leg member are oriented mutually parallelly, and the lower leg member has a greater width, extent perpendicular to the web member, than the upper leg member.

The lower leg member may have attachment openings to facilitate attachment of the displacement device to, e.g., the auxiliary frame structure of the tractor vehicle. Preferably, the attachment openings are disposed at discrete distances apart, in a row or rows, so that numerous attachment means and configurations are possible for attaching the fifth wheel coupling to various frame structures and/or auxiliary frame structures, of the tractor vehicle.

Advantageously, the abovementioned catch openings are rectangularly shaped, have rectangular cross sections, and they engage or each engages a complementarily shaped locking piece or locking member.

The fabrication is particularly economical if the base bars are fabricated from extruded steel material. This has the advantage that the base bars can be fabricated from a profile which has prescribed stress characteristics.

The catch openings may be produced in the base bars by means of laser or plasma cutting techniques. This allows selection of a very high-strength material for the base bars, because the catch openings may be produced while the bar is still in a somewhat ductile state near the limit of flowability, i.e. during the forming process of the beams of which the base bars are comprised.

When the displacement device is assembled, the locking piece which engages a given base bar should engage at least one of the catch openings from the "interior side", namely the side of the vertical web member which is directed toward the vertical web member of the opposite base bar; with this arrangement, the locking pieces are in protected zones, protecting against accidental dislodgment of a locking piece from a locking position into a position which allows displacement.

BRIEF DESCRIPTION OF THE DRAWINGS

For purposes of better understanding, the invention will be described in more detail hereinbelow, with reference to the accompanying six Figures wherein.

DETAILED DESCRIPTION OF THE INVENTION

Figure 1:
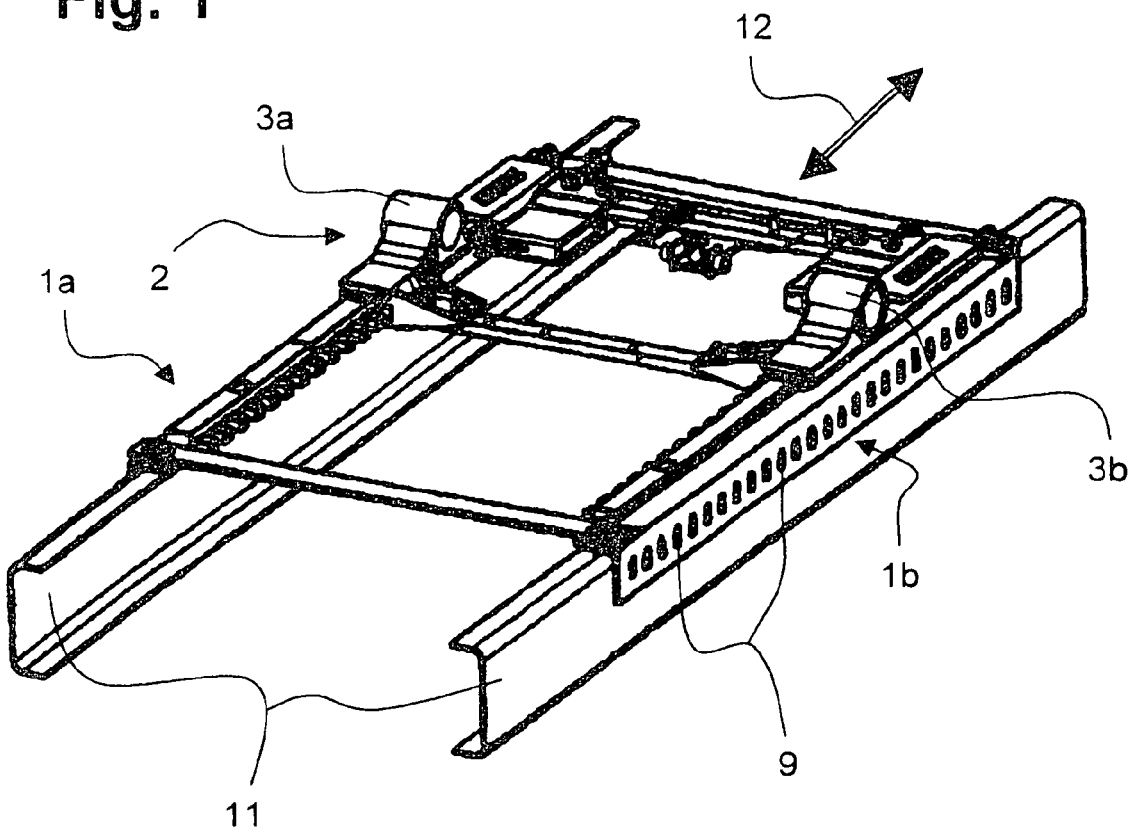
FIG. 1 is a perspective view of a displacement device according to the state of the art.

FIG. 1 shows a frame 11 of a truck tractor, not further depicted, to which a known device according to the state of the art, is connected. The displacement device is comprised of two base bars (1a, 1b) which are fixed to the frame 11 via screws, not shown, which are applied from the outside through openings 9. An upper carriage or upper part 2 with two bearing blocks (3a, 3b) may be provided which is movable in the direction of movement 12 with respect to the base bars (1a, 1b). A fifth wheel coupling, not shown, is supported between the bearing blocks (3a, 3b).

Figure 2:
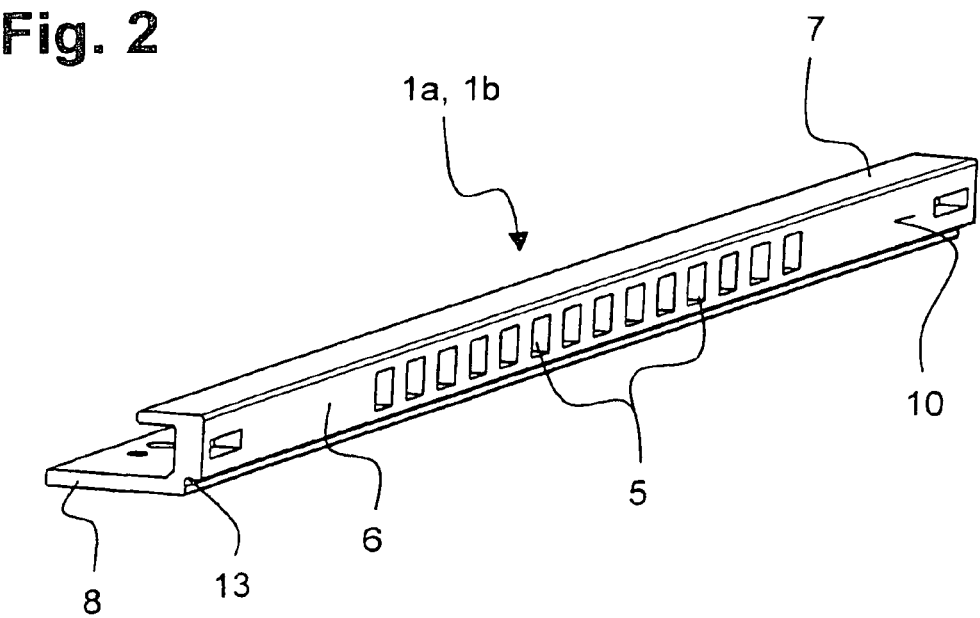
FIG. 2 is an interior perspective view of a base bar, from an angle.

One of the base bars (1a, 1b) of the inventive displacement device is illustrated in a perspective view in FIG. 2, viewed, at an angle, generally showing the inner side 10. Each base bar (1a; 1b) is in the form of a C-profile with a vertical web member 6 which joins to an upper leg 7 and a lower leg 8 at its respective edges. The lower leg 8 extends outward beyond the upper leg 7.

In a middle region along the length of the base bar (1a; 1b), the base bar (1a; 1b) has a total of 14 catch openings 5 which penetrate the vertical web member 6. These catch openings 5 serve to engage a locking piece 4 of the respective bearing block (3a; 3b) (FIG. 5).

Figure 3:
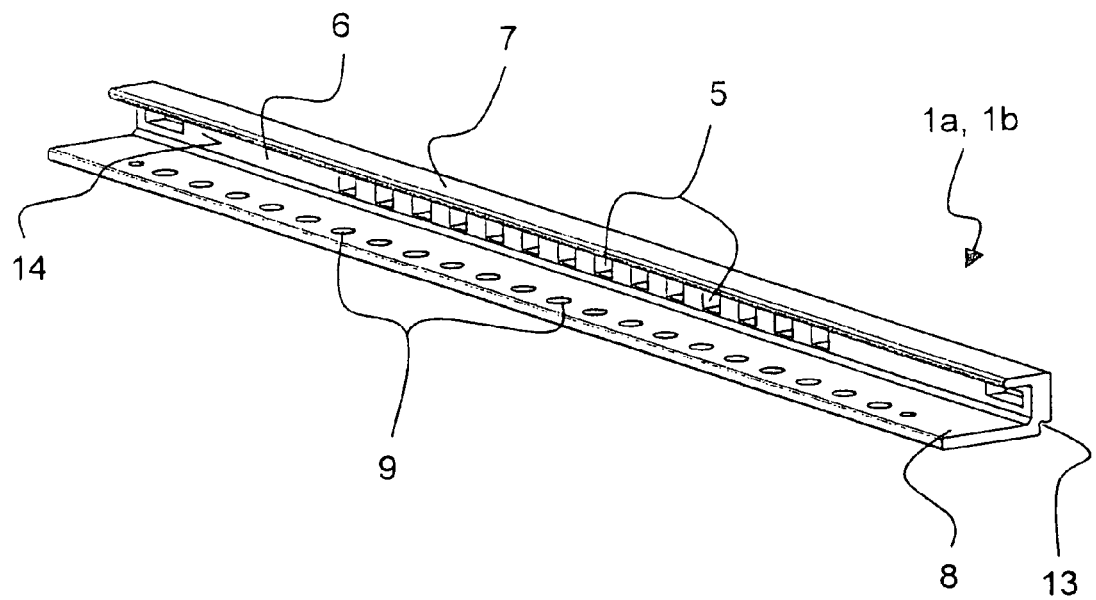
FIG. 3 is an exterior perspective view of a base bar, from an angle.

FIG. 3 is a rotated, "external" perspective view of the base bar (1a; 1b), at an angle, so as to generally show the outer side 14. In this external or outer view, the catch openings 5 in the vertical web member 6 are also visible. The thickness of the vertical web member 6 is greater than the thickness of the upper leg member 7 or lower leg member 8. A row of attachment openings 9 is provided along the axial length of the lower leg member 8; these openings facilitate attachment of the base bar (1a; 1b) and thereby the entire displacement device to the frame 11 of a vehicle (see FIG. 1).

Figure 4:
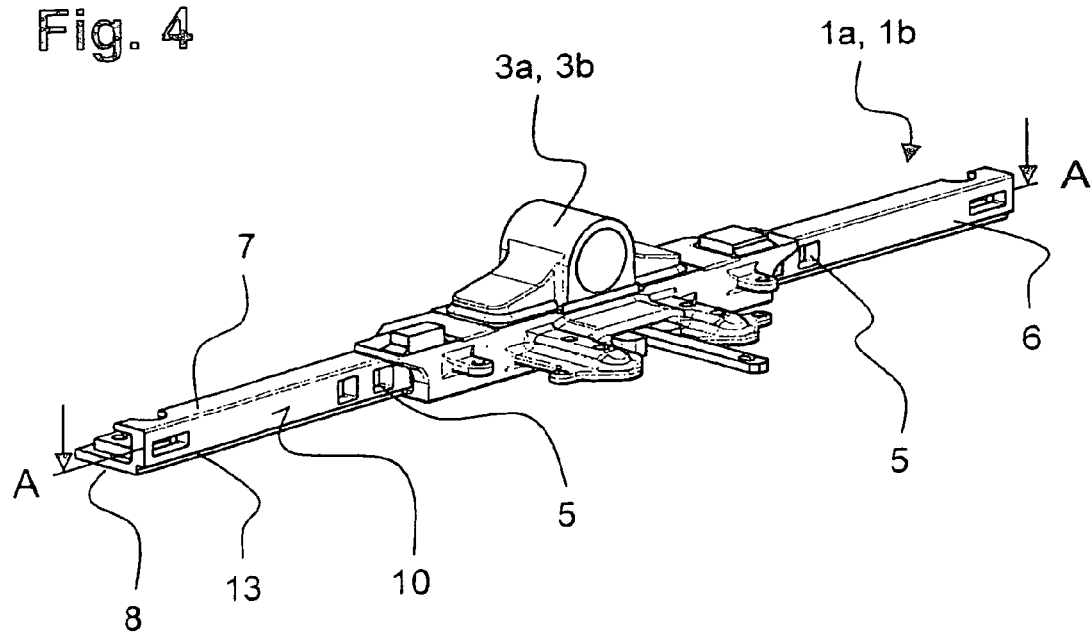
FIG. 4 is a view of a base bar according to FIG. 1, having a bearing block and a locking element.

FIG. 4 shows a bearing block (3a; 3b) which is borne on one of the base bars (1a, 1b) so as to be slidable along said base bar. The bearing block (3a; 3b) extends over the upper leg member 7 from above. A guide groove 13 is also provided on the inner side 10, of the base bar, at the region where the vertical web member 6 joins the lower leg member 8, which groove 13 extends over the entire axial length of the base bar (1a; 1b), such as to provide further means of guiding for the bearing block (3a; 3b). A supporting shoe 15 of the bearing block (3a; 3b) abuts this guide groove 13, as seen from the underside view of FIG. 5.

Figure 5:
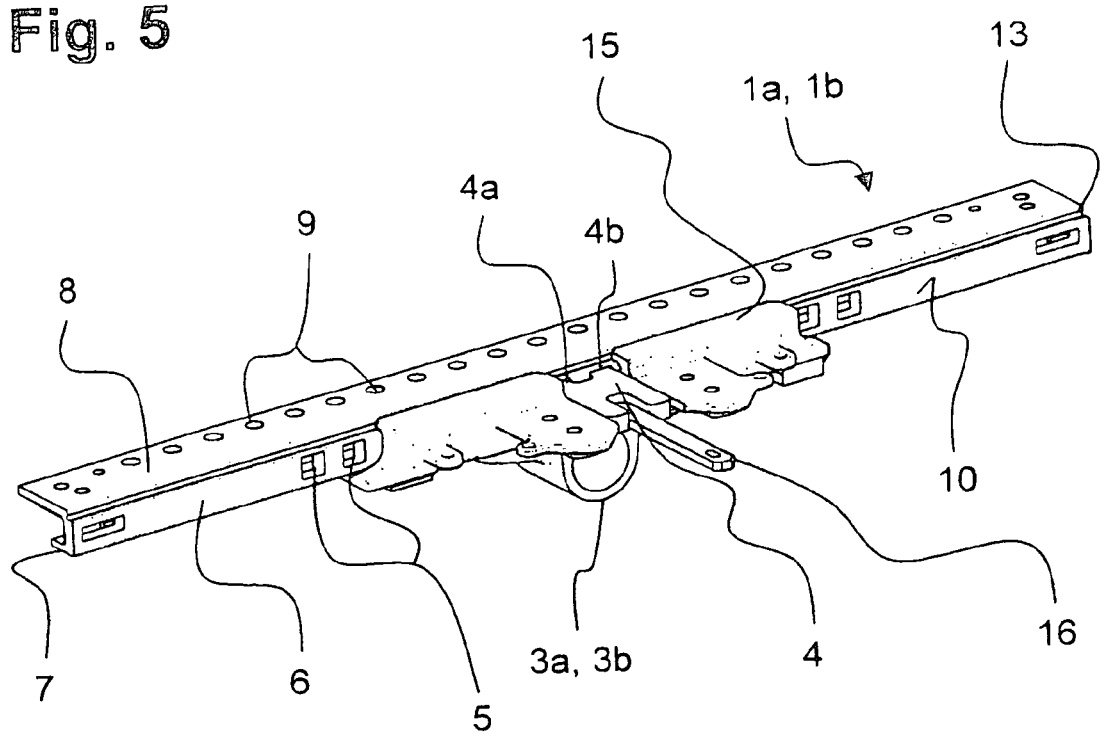
FIG. 5 is a perspective bottom view of a base bar having a bearing block and a locking element.

Also shown in FIG. 5 is a locking piece 4 disposed on the bearing block (3a; 3b), wherewith two concertedly acting latch members (4a, 4b) on the locking piece 4 engage in two neighboring catch openings (5, 5), of the base bar (1a; 1b), so as to form-interlockingly lock the bearing block (3a; 3b) with respect to the base bar (1a; 1b). In order to release the bearing block (3a; 3b), the latch members (4a, 4b) are withdrawn from the zone of engagement by means of a tensile bar 16, after which the bearing block (3a; 3b) is free to be slid along the base bar (1a; 1b). The supporting shoe 15 has a gap in it in the region of the locking piece 4 (FIG. 5).

Figure 6:
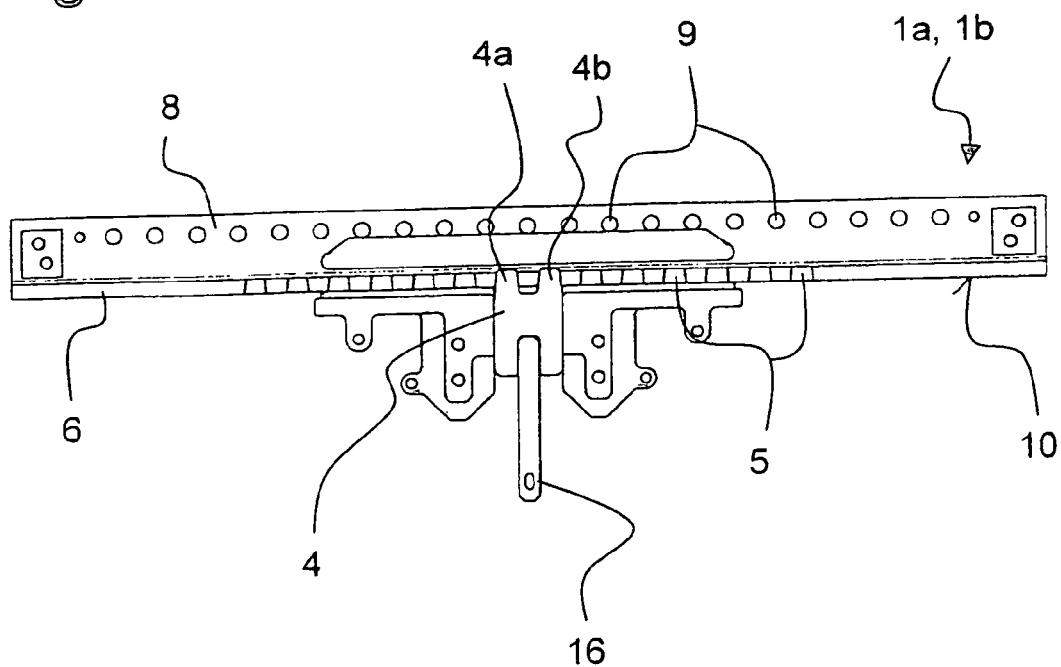
FIG. 6 is a longitudinal cross section through line A-A of FIG. 4.

FIG. 6 is a longitudinal cross sectional view through the vertical web member 6 of the base bar (1a; 1b). In this view one can see particularly well the engagement of the two latch members (4a, 4b) in two neighboring catch openings (5, 5).

List of reference numerals:
1a, 1b base bar.
2 upper carriage or upper part of the displacement device.
3a, 3b bearing block.
4 locking piece.
4a, 4b latch member of locking piece.
5, 5 catch opening.
6 web member of the inventive base bar.
7 upper leg member of the inventive base bar.
8 lower leg member of the inventive base bar.
9, 9 attachment openings.
10 interior side of the inventive base bar.
11 frame of the truck tractor which ultimately bears the fifth wheel coupling.
12 direction of movement of the upper carriage etc.
13 guide groove.
14 exterior side of the inventive base bar.
15 supporting shoe.
16 tensile bar.

What is claimed is:

1. A displacement device for fifth wheel couplings, comprised of: two base bars and an upper part or upper carriage wherein the upper part or upper carriage bears the fifth wheel coupling, wherein said upper part is comprised of two bearing blocks which are mounted so as to be slidable on the base bars wherein each of which bearing blocks, when in a locked position, engages one of the base bars by means of locking pieces; wherein at least one of the base bars has catch openings disposed at distances along its axial extent, and wherein the catch openings serve to accommodate the locking piece(s) wherein each of the base bars is in the form of a C-profile of unit construction having a vertical web member which joins to an upper leg member and a lower leg member at its respective edges, wherewith the catch openings are disposed in said vertical web member, wherein the lower leg member has attachment openings.

2. The displacement device according to claim 1, wherein the upper leg member and lower leg member are parallel to each other.

3. The displacement device according to claim 1, wherein each of the catch openings has a rectangular cross section or rectangular shape.

4. The displacement device according to claim 1, wherein the base bars are fabricated from extruded steel material.

5. The displacement device according to claim 1, wherein the catch openings are produced in the base bars by means of laser or plasma cutting techniques.

6. The displacement device according to claim 1, wherein the locking piece engages at least one catch opening from an interior side.

7. The displacement device according to claim 6, wherein the upper leg member and lower leg member are parallel to each other.

8. The displacement device according to claim 7, wherein each of the catch openings has a rectangular cross section or rectangular shape.

9. The displacement device according to claim 8, wherein the base bars are fabricated from extruded steel material.

10. The displacement device according to claim 9, wherein the catch openings are produced in the base bars by means of laser or plasma cutting techniques.

11. The displacement device according to claim 10, wherein the locking piece engages at least one catch opening from an interior side.

12. A displacement device for fifth wheel couplings, comprised of: two base bars and an upper part or upper carriage wherein the upper part or upper carriage bears the fifth wheel coupling, wherein said upper part is comprised of two bearing blocks which are mounted so as to be slidable on the base bars wherein each of which bearing blocks, when in a locked position, engages one of the base bars by means of locking pieces; wherein at least one of the base bars has catch openings disposed at distances along its axial extent, and wherein the catch openings serve to accommodate the locking piece(s) wherein each of the base bars is in the form of a C-profile of unit construction having a vertical web member which joins to an upper leg member and a lower leg member at its respective edges, wherewith the catch openings solely are disposed in said vertical web member, wherein the upper leg member and lower leg member are parallel to each other, wherein the lower leg member has attachment openings, and wherein each of the catch openings has a rectangular cross section or rectangular shape.

13. The displacement device according to claim 12, wherein the base bars are fabricated from extruded steel material, wherein the catch openings are produced in the base bars by means of laser or plasma cutting techniques, and wherein the locking piece engages at least one catch opening from an interior side.

14. A displacement device for fifth wheel couplings, comprised of: two base bars and an upper part or upper carriage wherein the upper part or upper carriage bears the fifth wheel coupling, wherein said upper part is comprised of two bearing blocks which are mounted so as to be slidable on the base bars wherein each of which bearing blocks, when in a locked position, engages one of the base bars by means of locking pieces; wherein at least one of the base bars has catch openings disposed at distances along its axial extent, and wherein the catch openings serve to accommodate the locking piece(s) wherein each of the base bars is in the form of a C-profile of unit construction having a vertical web member which joins to an upper leg member and a lower leg member at its respective edges, wherewith the catch openings are disposed in said vertical web member and wherein each of the catch openings has a rectangular cross section or rectangular shape, wherein the lower leg member has attachment openings.

15. The displacement device according to claim 14, wherein the upper leg member and lower leg member are parallel to each other.

16. The displacement device according to claim 14, wherein the base bars are fabricated from extruded steel material, wherein the catch openings are produced in the base bars by means of laser or plasma cutting techniques, and wherein the locking piece engages at least one catch opening from an interior side.

* * * * *